(12) United States Patent
Rahnama Moghaddam (10) Patent No.: US 11,164,085 B2
(45) Date of Patent: Nov. 2, 2021

(54) SYSTEM AND METHOD FOR TRAINING A NEURAL NETWORK SYSTEM

(71) Applicant: Booz Allen Hamilton Inc., McLean, VA (US)

(72) Inventor: Arash Rahnama Moghaddam, Arlington, VA (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 16/394,644

(22) Filed: Apr. 25, 2019

(65) Prior Publication Data

US 2020/0342326 A1 Oct. 29, 2020

(51) Int. Cl.
*G06N 3/08* (2006.01)
*G06N 20/10* (2019.01)
*G06N 3/04* (2006.01)

(52) U.S. Cl.
CPC ............ *G06N 3/084* (2013.01); *G06N 3/04* (2013.01); *G06N 20/10* (2019.01)

(58) Field of Classification Search
CPC .......... G06N 3/084; G06N 20/10; G06N 3/04
See application file for complete search history.

(56) References Cited

U.S. PATENT DOCUMENTS

2018/0114294 A1* 4/2018 Yang .................. G06T 7/90
2019/0171908 A1* 6/2019 Salavon ............. G06K 9/6215

OTHER PUBLICATIONS

Yoshida et al. "Spectral Norm Regularization for Improving the Generalizability of Deep Learning", National Institute of Informatics, pp. 1-12 (Year: 2017).*
Sokolić, Jure, et al. "Robust large margin deep neural networks." IEEE Transactions on Signal Processing 65.16 (2017): 4265-4280. (Year: 2017).*
Aleksander Madry et al., "Towards Deep Learning Models Resistant to Adversarial Attacks", Statistics—Machine Learning, Nov. 9, 2017, 3 pages.
Alexey Kurakin et al., "Adversarial Example in the physical world", Computer Science—Computer Vision and Pattern Recognition, Feb. 11, 2017, 3 pages.
Alhussein Fawzi et al., "Adversarial vulnerability for any classifier", Computer Science—Machine Learning, Nov. 30, 2018, 3 pages.

(Continued)

*Primary Examiner* — Li B. Zhen
*Assistant Examiner* — Henry Nguyen
(74) *Attorney, Agent, or Firm* — Buchanan Ingersoll & Rooney PC (57) ABSTRACT

A computer-implemented method for training a neural network system. The method includes receiving at least a first data vector at a first layer of the neural network system; applying a function to the first data vector to generate at least a second data vector, wherein the function is based on a layer parameter of the first layer that includes at least a weight matrix of the first layer; comparing at least the first data vector and the second data vector to obtain a loss value that represents a difference between the first data vector and the second data vector; updating the layer parameter based on the loss value; and adjusting the layer parameter based on a comparison of the updated layer parameter with a threshold value of the first layer.

12 Claims, 5 Drawing Sheets

(56) References Cited

OTHER PUBLICATIONS

Eric Wong et al., "Provable defenses against adversarial examples via the convex outer adversarial polytope", Computer Science—Machine Learning, Jun. 8, 2018, 3 pages.
G. Zames, "On the Input-Output Stability of Time-Varying Nonlinear Feedback Systems Part I: Conditions Derived Using Concepts of Loop Gain, Conicity, and Positivity", IEEE Transactions on Automatic Control, vol. AC-11, No. 2, Apr. 1966, pp. 228-238.
Haifeng Qian et al., "L2-Nonexpansive Neural Networks", Computer Science—Artificial Intelligence, Feb. 6, 2019, 3 pages.
Hanie Sedghi et al., "The Singular Values of Convolutional Layers", Computer Science—Machine Learning, Mar. 6, 2019, 3 pages.
Henry Gouk et al., "Regularisation of Neural Networks by Enforcing Lipschitz Continuity", Statistics—Machine Learning, Sep. 14, 2018, 3 pages.
Huan Zhang et al., "Efficient Neural Network Robustness Certification with General Activation Functions", Neural Information Processing System (NIPS), 2018, 17 pages.
Murat Arcak et al., "Diagonal stability of a class of cyclic systems and its connection with the secant criterion", Brief paper, Available online at www.sciencedirect.com, 2006, pp. 1531-1537.
Qian Huang et al., "Intermediate Level Adversarial Attack for Enhanced Transferability", Computer Science—Machine Learning, Nov. 20, 2018, 3 pages.
Takeru Miyato et al., "Distributional Smoothing with Virtual Adversarial Training", Statistics—Machine Learning, Jun. 11, 2016, 3 pages.
Tsui-Wei Weng et al., "Towards Fast Computation of Certified Robustness for ReLU Networks", Statistics—Machine Learning, Oct. 2, 2018, 3 pages.
Valentina Zantedeschi et al., "Efficient Defenses Against Adversarial Attacks", Computer Science—Machine Learning, Aug. 30, 2017, 3 pages.
Yuichi Yoshida et al., "Spectral Norm Regularization for Improving the Generalizability of Deep Learning", Statistics—Machine Learning, May 31, 2017, 3 pages.
Takeru Miyato et al., "Spectral Normalization for Generative Adversarial Networks", Published as a Conference Paper at ICLR 2018, arXiv:1802.05957v1 [cs.LG] Feb. 16, 2018 (26 pages).
Hassan K. Khalil, "Nonlinear Systems—Third Edition", Department of Electrical and Computer Engineering Michigan State University, vol. 2. Prentice Hall, New Jersey, 1996 (93 pages).
Jan C. Willems, "Dissipative Dynamical Systems Part I: General Theory", Archive for Rational Mechanics and Analysis, vol. 45(5)—Abstract, 1972 (9 pages).
Olga Taussky, "A Recurring Theorem on Determinants", The American Mathematical Monthly, 56(10P1)—https"//doi-org/10.1080/00029890.1949.11990209, 672-676, Apr. 10, 2018, (2 pages).
Matt Mazur called "A Step by Step Backpropagation Example", https://mattmazur.com/2015/03/17/a-stepby-step-backpropagation-example/ (25 pages).
Eugenius Kaszkurewicz and Amit Bhaya, "Matrix Diagonal Stability in Systems and Computation", Springer Science & Business Media, 2012 (35 pages).

\* cited by examiner

SYSTEM AND METHOD FOR TRAINING A NEURAL NETWORK SYSTEM

FIELD

The present disclosure relates to a system and method for training a neural network system.

BACKGROUND INFORMATION

Deep learning can be considered as the driving force behind the recent rise in artificial intelligence (AI) solutions. Deep learning algorithms are capable of providing a performance on par with, if not exceeding, the human performance in tasks such as classification, regression, and prediction in fields such as computer vision, natural language processing, and voice recognition.

While deep neural algorithms have demonstrated great success in solving complex problems, they have also shown to be quite vulnerable to adversarial attacks. These vulnerabilities undermine the practicality of neural network systems (e.g., deep neural networks (DNNs)) and present a major risk to the deployment of DNNs in safety-critical environments.

Adversarial attacks usually appear in the form of subtle perturbations to the input data which can deceive the model into making incorrect decisions. One challenging aspect of these attacks is the fact that these small perturbations, while capable of completely fooling the AI model, are imperceptible to the human eye. This indicates that most deep learning models are not stable and can be easily penetrated. Consequently, it is crucial to design a method for training AI models that guarantees resilience against a set of adversarial attacks, more specifically perturbations at certain magnitudes.

There has been a recent surge in developing algorithms that attempt to curb negative effects of adversarial attacks on deep learning networks. These efforts however, are usually computationally infeasible, not scalable, and negatively affect the generalizability of the models. Known attempts focus on training the models on synthetically generated attack datasets. However, it has been shown that these models usually do not generalize well against different types of attacks and, when deployed, their accuracy can be considerably worse than expected.

As trained deep learning models are increasingly developed for more sensitive tasks, it becomes imperative to proactively design robust models that insure resilience against adversarial attacks while maintaining the desired performance indices. As a result, there is a great need in the industry for stable, robust, and computationally efficient solutions that can govern the training and design of deep learning networks to produce more effective models that are highly accurate, resilient against adversarial attacks, and generalize well. Aspects of the present disclosure present effective technical training models to address the previously described challenges.

SUMMARY

A computer-implemented method for training a neural network system having at least one layer is disclosed. The method includes receiving at least a first data vector at a first layer of the neural network system; applying a function to the first data vector to generate at least a second data vector, wherein the function is based on a layer parameter of the first layer that includes at least a weight matrix of the first layer; comparing at least the first data vector and the second data vector to obtain a loss value that represents a difference between the first data vector and the second data vector; updating the layer parameter based on the loss value; and adjusting the layer parameter based on a comparison of the updated layer parameter with a threshold value of the first layer.

A training system for training a neural network system is disclosed. The training system includes a generation module configured to apply a function to a first data vector to generate at least a second data vector, wherein the function is based on a layer parameter of a first layer of a neural network, the layer parameter including at least a weight matrix of the first layer; a comparison module configured to at least compare the first data vector and the second data vector to obtain a loss value that represents a difference between the first data vector and the second data vector, and to update the layer parameter based on the loss value; and an adjustment module configured to adjust the layer parameter based on a comparison of the updated layer parameter with a threshold value of the first layer.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which.

DETAILED DESCRIPTION

Aspects of the present disclosure provide a control theoretic perspective to approach the previously described problem of robustness in neural network systems. As referred herein, a neural network system (e.g. a DNN) can be any framework for various different machine learning algorithms to work together and process complex data inputs. Such a framework can learn to perform tasks by considering examples, with or without being programmed with any task-specific rules.

For example, in image recognition, a neural network system can learn to identify images that contain cats by analyzing example images that have been manually labeled as "cat" or "no cat" and using the results to identify cats in other images. A neural network system can do this without any prior knowledge about cats, for example, that they have fur, tails, whiskers, and cat-like faces. Instead, a neural network system can automatically generate identifying characteristics from learning material that it processes.

In an exemplary embodiment of the present disclosure, each individual layer of the neural network system can be treated as a nonlinear dynamical system. The stability and robustness for each layer of the model can be proved and then the stability and robustness for the entire model can be proved.

A layer of a neural network system as disclosed herein can refer to an aggregation of nodes of the neural network. Different layers can perform different kinds of transformations on their inputs. Signals in the neural network system can travel from a first layer of the network to the last layer, possibly after traversing the layers multiple times.

Aspects of the present disclosure provide a Lyapunov-based method for training a DNN to perform with stability and robustness. The presently disclosed training method and system can regularize the spectral norm of the weight matrix at each individual layer of the DNN. The fundamental upper-bounds for the negative effects of adversarial perturbations on robustness can be derived by characterizing the exact changes that adversarial perturbations introduce to the input, and the corresponding changes caused in the output of the DNN.

The presently disclosed technique can be robust against adversarial perturbations injected into the input of the hidden layers. The present technique has been evaluated extensively on a combination of datasets and network architectures, and against some of the more well-known adversarial attacks as described in detail below.

A nonlinear system H can be represented as follows:

$$H: \begin{cases} \dot{x}(t) = f(x(t), u(t)) \\ y(t) = h(x(t), u(t)), \end{cases}$$

where $x(t) \in X \subseteq R^n$, $u(t) \in U \subseteq R^m$, and $y(t) \in Y \subseteq R^l$ are respectively the state, input, and output of the system, and X, U, and Y are the state, input and output spaces.

In an exemplary embodiment, any layer inside a deep learning model can be seen as the nonlinear system H, as previously described. For a layer l, u(t) can have the size of a layer l-1 and stand for an input to the layer before it is transformed by the weights and biases. y(t) can have the size of layer l and can be the output of layer l after the activation functions. Similarly, h and f can be functions that model the state changes (x(t)) occurring during the training of the DNN and their relationship to the input and output signals.

System H can be incrementally finite-gain Lp-stable, if for any two inputs u1(t), u2(t)∈U, there exists a positive gain Γ, such that over the time interval [0, T] the following relation holds, $\|y_{2\tau}-y_{1\tau}\|_{L_p} \leq \Gamma \|u_{2\tau}-u_{1\tau}\|_{L_p}$. Further discussion on such a system H can be found in Hassan K. Khalil, *Nonlinear Systems*, volume 2. Prentice Hall New Jersey, 1996, which is incorporated in its entirety by reference.

In an exemplary embodiment, $\|y_{2\tau}-y_{1\tau}\|_{L_p}$ and $\|u_{2\tau}-u_{1\tau}\|_{L_p}$ can represent the $L_p$-norm of the truncated signals over the time interval [0, T] and p can be any positive number (usually chosen to be p=1 or p=2). For example, when p=2, the following holds:

$$\|y_{2\tau} - y_{1\tau}\|_{L2} = \sqrt{\sum_{i=1}^{\tau} (y_{2\tau}(i) - y_{1\tau}(i))^T (y_{2\tau}(i) - y_{1\tau}(i))}.$$

In an exemplary embodiment, system H can be instantaneously incrementally finite-gain $L_p$-stable if the relation $\|y_2-y_1\|_{L_p} \leq \Gamma \|u_2-u_1\|_{L_p}$ is instantaneously met for any two input values $u_1, u_2 \in U$. If a system is incrementally finite-gain stable, then the changes in the output of the entire system can be bounded by the changes in the input of the entire system. As a result, if the changes in the input are minuscule (which is the case for the majority of adversarial attacks), then the changes in their respective outputs can also be minuscule. This does not place any constraints on the initial conditions of the entire neural network system, allowing for producing model distributions which have disconnected support, as discussed in Alhussein Fawzi, Hamza Fawzi, and Omar Fawzi, Adversarial vulnerability for any classifier, arXiv preprint arXiv: 1802.08686, 2018.

In an exemplary embodiment, System H can be instantaneously Incrementally Output Feedback Passive (IOFP), if it is dissipative with respect to the well-defined supply rate, $\omega(u_2-u_1, y_2-y_1)=(u_2-u_1)^T(y_2-y_1)-\delta(y_2-y_1)^T(y_2-y_1)$, for some positive δ (e.g. output passivity index) ∈R. System H can be instantaneously Incrementally Input Feed-Forward Passive (IIFP), if it is dissipative with respect to the well-defined supply rate, $\omega(u_2-u_1, y_2-y_1)=(u_2-u_1)^T(y_2-y_1)-v(y_2-y_1)^T(y_2-y_1)$, for some positive v (e.g. input passivity index) ∈R. System H can be considered to be instantaneously Incrementally Input Feed-Forward Output Feedback Passive (IIFOFP), if it is dissipative with respect to the well-defined supply rate, $\omega(u_2-u_1, y_2-y_1)=(u_2-u_1)^T(y_2-y_1)-\delta(y_2-y_1)^T(y_2-y_1)-v(u_2-u_1)^T(u_2-u_1)$, for some positive v ∈R and δ∈R where v×δ≤¼. Further description of the IOFP, IIFP, and IIFOFP systems can be found in George Zames, "On the input-output stability of time-varying nonlinear feedback systems part one: Conditions derived using concepts of loop gain, conicity, and positivity", *IEEE transactions on automatic control*, 11(2):228-238, 1966. This publication is incorporated in its entirety by reference.

If the dynamical system H is Incrementally Output Feedback Passive (IOFP) with δ>0, then it can be incrementally finite-gain $L_2$-stable with the gain Γ=1/δ. v and δ can take negative values. The present disclosure provides a positive δ for a layer because it implies finite-gain Lp-stability for that layer. Positive values for both v and δ and can imply stability and robustness for that layer.

In an exemplary embodiment, a supply rate ω(u(t), y(t)) is a well-defined supply rate, if for all $t_0, t_1$, where $t_1 \geq t_0$, and all solutions x(t) ∈X, u(t) ∈U, and y(t) ∈Y of the dynamical system, $\int_{t_0}^{t_1} |\omega(u(t), y(t))| dt < \infty$. That is, a well-defined supply rate function is one that is finite. Further discussion on supply rate can be found in Jan C. Willems, Dissipative Dynamical Systems Part I: General Theory, *Archive for Rational Mechanics and Analysis*, 45(5):321-351, 1972. For an IIFP, IOFP, or IIFOFP system, the system's supply rate can be greater or equal zero, i.e. $V=\omega(u_2-u_1, y_2-y_1) \geq 0$.

In an exemplary embodiment, a matrix $A \in R^{n \times n}$ can be Lyapunov diagonally stable, if there exists a diagonal matrix D>0 such that $DA+A^TD<0$. For example, the following matrix is Lyapunov diagonally stable:

$$A = \begin{bmatrix} -\alpha_1 & 0 & \cdots & 0 & -\beta_N \\ \beta_1 & -\alpha_2 & \ddots & & 0 \\ 0 & \beta_2 & -\alpha_3 & \ddots & \vdots \\ \vdots & \ddots & \ddots & \ddots & 0 \\ 0 & \cdots & 0 & \beta_{N-1} & -\alpha_N \end{bmatrix},$$

$\alpha_i > 0, \beta_i > 0, i = \ldots, N$ where $N > 2$, when the secant criterion $$\frac{\beta_1 \times \beta_2 \times \cdots \times \beta_N}{\alpha_1 \times \alpha_2 \times \cdots \times \alpha_N} < \sec\left(\frac{\pi}{N}\right)^N = \frac{1}{\cos\left(\frac{\pi}{N}\right)^N}$$

holds. Further discussion on Lyapunov diagonally stable matrix can be found in the commentary by Murat Arcak and Eduardo D Sontag. Diagonal stability of a class of cyclic systems and its connection with the secant criterion. *Automatica*, 42(9):1531-1537, 2006, incorporated herein by reference.

In an exemplary embodiment, a square matrix can be a quasi-dominant matrix, if there exists a positive diagonal matrix $P=\text{diag}\{p_1, p_2, \ldots, p_n\}$ such that $a_{ii}p_i \geq \Sigma_{j\neq i}|a_{ij}|p_{ij}$, $\forall i$, and/or $a_{jj}p_j \geq \Sigma_{i\neq j}|a_{ji}|p_i$, $\forall j$. If these inequalities are met strictly, then the matrix can be strictly row-sum (or column-sum) quasi-dominant. If P can be chosen as the identity matrix, then the matrix can be row- or column-diagonally dominant.

In an exemplary embodiment, a symmetric quasi-dominant matrix can be positive definite. If a matrix A can be diagonally stable, then $A^T$ can also be diagonally stable. Further discussion on matrix properties can be found in Eugenius Kaszkurewicz and Amit Bhaya, *Matrix diagonal stability in systems and computation*, Springer Science & Business Media, 2012, and Olga Taussky, A recurring theorem on determinants, *The American Mathematical Monthly*, 56(10P1):672-676, 1949, both incorporated in their entirety by reference.

Figure 5:
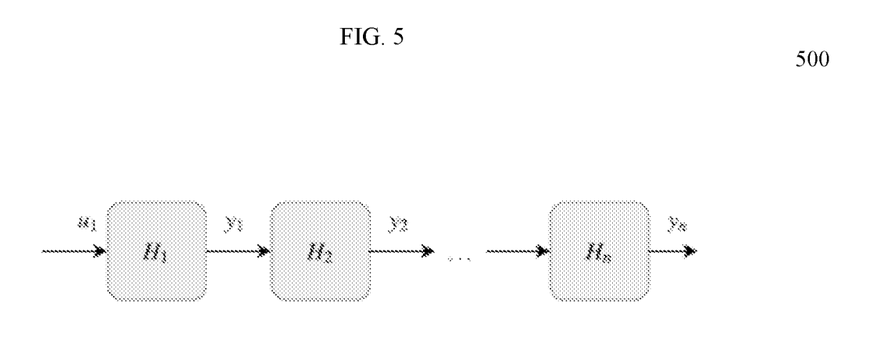
FIG. 5 shows an exemplary deep neural network modeled as a cascade of nonlinear systems.

In an exemplary embodiment, each layer of the DNN can be treated as a nonlinear dynamical system as previously defined, i.e., $H_i$ for all layers i=1, . . . , N. FIG. 5 shows a DNN modeled as a cascade of nonlinear systems.

In an exemplary embodiment, a nonlinear sub-system can be defined as a layer in the network which can accept an input vector with the size of the previous layer and produce an output vector with the size of the current layer. The output can be produced after Leaky ReLu transformations.

In an exemplary embodiment, a deep learning model can be trained to place specific conditions under which each layer $H_i$ is instantaneously IIFOFP with specific indices $v_i$ and $\delta_i$ on the weight matrices. These conditions can place specific constraints on the weight matrices at a given layer and be enforced during backpropagation. As a result, the entire interconnection can be instantaneously IIFOFP and consequently finite-gain $L_p$-stable. This means that the DNN's output is robust against adversarial changes injected into the input given a specific adversarial p-norm $\|\in\|_p$ because the changes in the output of the DNN are now bounded by the changes in the input of the DNN.

Training a DNN with the presently disclosed techniques would result in no unpredictable behavior occurring on the output side of the DNN for the following reasons. The adversary would need to inject larger noise into the input of the deep learning model in order to cause larger changes in the output of the DNN and to affect the decision making process. These larger adversarial signals, however, would be easier to detect.

The DNN trained with the presently disclosed techniques can be robust against both the manipulation of the input signal by the adversary and the introduction of any type of signal manipulation at the layer level, i.e., the system is robust in cases where the adversary injects noise into the output of a hidden layer before it is fed into the next layer.

Aspects of the present disclosure consider Leaky ReLU activation functions. $\in$ can be a measure for intervention. $\Delta$ can represent the extent of input manipulation committed by the adversary. $\Delta$-based manipulations of different norms can be produced by well-known attacks including the Fast Gradient Method (FGM) method, Projected Gradient Method (PGM) method and the Wasserstein Distributionally Adversarial Training method (WRM).

In an exemplary embodiment, the effectiveness of the presently disclosed techniques can be tested on synthetically-generated adversarial datasets where the adversarial dataset is generated based on the following well-known attack schemes: the FGM method, the PGM method and the WRM method. These attacks produce the synthetically generated adversarial datasets by distorting images in the well-known MNIST and CIFAR datasets.

In an exemplary embodiment, the effectiveness of the presently disclosed techniques can be noticed by comparing the performance of these techniques against other approaches on the synthetically-generated datasets. The presently disclosed techniques have higher prediction accuracy and hence more robustness against adversarial attacks compared to DNNs trained by other training methods. Accuracy can be defined as the ability of a DNN to correctly predict the class to which an image belongs, even if the image has been distorted by the adversary.

These adversarial attacks are described in greater detail in the following references, which are all incorporated in entirety by reference. 1) Alexey Kurakin, Ian Goodfellow, and Samy Bengio, "Adversarial examples in the physical world", arXiv preprint arXiv:1607.02533, 2016; 2) Aleksander Madry, Aleksandar Makelov, Ludwig Schmidt, Dimitris Tsipras, and Adrian Vladu, "Towards deep learning models resistant to adversarial attacks", arXiv preprint arXiv: 1706.06083, 2017; and 3) Takeru Miyato, Shin-ichi Maeda, Masanori Koyama, Ken Nakae, and Shin Ishii, "Distributional smoothing with virtual adversarial training", arXiv preprint arXiv: 1507.00677, 2015.

In an exemplary embodiment, the presently disclosed techniques can find the minimum distortion of the adversarial examples that would lead to misclassification and thus certifying robustness in neural network classifiers for values smaller than the minimum distortion. A measure of robustness can be characterized based on a minimum performance index against adversarial attacks.

In an exemplary embodiment, for a given DNN, the (local) robustness of an arbitrary natural example u can be certified by ensuring that all of its neighborhood has the same inference outcome. The neighborhood of $u_l$ may be quantified by an $L_p$ ball centered at u, for any norm p≥1. Geometrically, the minimum distance of a misclassified nearby example to u can be the least adversary strength required to alter the target model's prediction, which can also be the largest possible robustness certificate for u. The conic behavior of the Leaky ReLU activation function and its relationship with Lyapunov stability and robustness can be utilized through the theory of passivity to train DNNs that are both stable and robust against adversarial attacks.

In an exemplary embodiment, an exact relationship between the incremental changes injected into the input signals of a DNN and their effects on the output of the deep learning model can be characterized. Consequently, a measure can be quantified for the robustness of the entire DNN. The presently disclosed techniques show that the output variations of the network are bounded by the input variations caused by the attack. The bounds can also be retrieved for each layer of the DNN if the layer is regularized to have $\delta_l > 0$.

In an exemplary embodiment, a DNN to be trained can be represented as a cascaded set of subsystems. For the entire neural network, $u_{l+1}=y_l=h_l(W_lu_l+b_l)$ for l=1, . . . , N for some N>2, where $u_l \in R^{nl-1}$ is the input feature of the l-th layer, and $W_l \in R^{nl \times nl-1}$ and $b_l \in R^{nl}$ are respectively the layer-wise weight matrix and bias vector applied to the flow of information from the layer l-1 to the layer l and hl: $R^{nl-1} \to R^{nl}$ models the entire numerical transformation at the l-th layer including the (non-linear) activation functions. Here, and $n_l$ represent the number of neurons in layers l-1 and l. For a set of parameters, $\Theta = \{W_l, b_l\} l=1 \ldots N$, the entire DNN can be denoted as $h_\Theta(u^{(1)}) = u^{(N)}$ by $h_\Theta: R^{n1} \to R^{nN}$.

In an exemplary embodiment, for a training data of size K, $(u_i, y_i)$, $i=1 \ldots K$, where $u_i \in R^{n1}$ and $y_i \in R^{nN}$, the loss function can be defined as $1/K \, L(h_\Theta(u_i), y_i)$, where L can be selected to be cross-entropy or the squared $L_2$-distance for classification and regression tasks, respectively, such that the model parameter to be learned can be $\Theta$.

In an exemplary embodiment, a goal is obtaining a model $\Theta$ that is insensitive to the perturbation of the input, such that the $L_p$-norm of $h(u+\Delta)-h(u)$ is small, where $u \in R^{n1}$ can be an arbitrary vector and $\Delta \in R^{n1}$ can be an engineered perturbation vector with a small $L_p$-norm injected by the adversary. In cases where a neural network exhibits nonlinearity, activation functions $h_\Theta$ can be a piecewise linear function such as ReLU, maxout and maxpooling. Hence, in a small neighborhood of u, $h_\Theta$ can be regarded as a linear function, represented by an affine map, $u \to W_{\Theta,u} u + b_{\Theta,u}$, using a matrix, $W_{\Theta,u} R^{n1 \times nL}$, and a vector, $b_{\Theta,u} \in R^{nL}$, which depend on $\Theta$ and u. See, for e.g., Yuichi Yoshida and Takeru Miyato, Spectral norm regularization for improving the generalizability of deep learning, arXiv preprint arXiv: 1705. 10941, 2017, incorporated in its entirety by reference.

In an exemplary embodiment, model parameter $\Theta$ can be trained so that the output variations are small for small variations in input u. To further investigate the property of $W_{\Theta,u}$, each activation function, modeled by $h_l$ can be a modified version of element-wise ReLU called the Leaky ReLU:

$$h_l(u_l) = \begin{cases} u_l & \text{if } u_l = W_l u_{l-1} + b_l \text{ is positive} \\ a u_l & \text{otherwise} \end{cases}$$

where $0 < a < 1$.

In an exemplary embodiment, to bound the variations in the output of the neural network by the variations in the input, it can suffice to bound these variations for each $l \in \{1, \ldots, L\}$. Here, the attack variations $\Delta$ can be injected by the adversary into the initial input or the signal traveling from a hidden layer to another (the input of the hidden layers). To overcome such attack variations, a form of regularization scheme can be described.

In an exemplary embodiment, a nonlinear sub-system can be defined as a layer inside the network which can accept an input of size $n_{l-1}$ (output of the previous layer) and produce an output of size $n_l$ (produced after the Leaky ReLU transformation). An injected perturbation, input u from the layer of size n, $u \in R^n$, by the adversary can be defined as $u+\Delta$ where $\Delta \in R^n$ is the attack vector that can take any value. The perturbed input vector u can be within a $\Delta$-bounded $L_p$-ball centered at u i.e., $u \in B_p(u, \Delta_0)$, where $B_p(u, \Delta_0) := \{u+\Delta \mid \|u+\Delta-u\|_p = \|\Delta\|_p \leq \Delta_0\}$.

In an exemplary embodiment, a numerical transformation at a hidden layer of the neural network can be IIFOFP and consequently finite-gain $L_p$-stable and robust, if the spectral norm of the weight matrix for the layer satisfies the following condition, $$\rho(W_l) \leq \frac{1}{\delta_l^2} + \frac{2|v_l|}{\delta_l}$$

where $\rho(W_l)$ is the spectral norm of the weight matrix at the layer l, and the hyper-parameters $\delta_l > 0$ and $v_l$ meet the condition $\delta_l \times v_l \leq 1$.

In an exemplary embodiment, the presently disclosed techniques show a relationship between the spectral norm of the weight matrix at the layer l and incrementally finite-gain $L_2$ stability of the layer as previously defined through the hyper-parameters $\delta_l$, $v_l$. The hyper-parameters $\delta_l$ and $v_l$ can be chosen to be positive for the layer to be incrementally finite-gain stable. The condition for each layer can be implemented during the training of the network. If the proposed condition on the spectral norm of each layer is met, then it can be posited that the entire network is stable and robust.

In an exemplary embodiment, for the input $u_l-1$ and input $u_{l-1} + \Delta_{l-1}$ at the layer l, $$\omega(u_{l-1} + \Delta_{l-1} - u_{l-1}, h(W_l[u_{l-1} + \Delta_{l-1}] + b_l) - h(W_l u_{l-1} + b_l)) =$$

$$\Delta_{l-1}^T \wedge_l W_l \Delta_{l-1} - \Delta_{l-1}^T (v_l I_l) \Delta_{l-1} - \Delta_{l-1}^T W_l^T \wedge_l^T (\delta_l I_l) \wedge_l W_l \Delta_{l-1}$$

where, $$\wedge_l = \begin{bmatrix} 1 & 0 & \cdots & \cdots & \cdots \\ 0 & \ddots & \ddots & & \vdots \\ \vdots & \ddots & 1 & 0 & \vdots \\ \vdots & & 0 & a & \ddots \\ \vdots & & & \ddots & \ddots & 0 \\ \cdots & \cdots & & & 0 & a \end{bmatrix}.$$

In an exemplary embodiment, for a layer to be IIFOFP with some $v_l$ and a positive $\delta_l$, the following relationship holds:

$$0 \leq [u_{l-1} + \Delta_{l-1} - u_{l-1}]^T [h_l(u_{l-1} + \Delta_{l-1}) - h_l(u_{l-1})] -$$
$$\delta_l [h_l(u_{l-1} + \Delta_{l-1}) - h_l(u_{l-1})]^T [h_l(u_{l-1} + \Delta_{l-1}) - h_l(u_{l-1})] -$$
$$v_l [u_{l-1} + \Delta_{l-1} - u_{l-1}]^T [u_{l-1} + \Delta_{l-1} - u_{l-1}]$$

In an exemplary embodiment, where $\delta_l > 0$ and norm of 2 (p=2), the above relationship can be represented as, $$0 \leq \left(\frac{1}{2\delta_l} + |v_l|\right) \|\Delta_{l-1}\|_2^2 - \frac{\delta_l}{2} \|\wedge_l W_l \Delta_{l-1}\|_2^2.$$

Further, the following properties hold, $\|\wedge_l W_l \Delta_{l-1}\|_2^2 \leq \|\wedge_l\|_2^2 \|W_l\|_2^2 \|\Delta_{l-1}\|_2^2$, $\|\wedge_l\|_2^2 \leq \gamma_{max}(\wedge_l^T \wedge_l) \leq 1$, where $\lambda_{max}$ can stand for the largest eigenvalue (singular value) of a matrix and $\gamma(W_l) \leq \|W_l\| \leq \rho(W_l) + \sigma$ where $\rho(W_l)$ can be the spectral radius of $W_l$ and $\sigma$ can be a small positive number. This can be simplified further as:

$$0 \leq \left(\frac{1}{2\delta_l} + |v_l|\right) \|\Delta_{l-1}\|_2^2 - \frac{\delta_l}{2} \|\wedge_l W_l \Delta_{l-1}\|_2^2 \leq$$
$$\left(\frac{1}{2\delta_l} + |v_l|\right) \|\Delta_{l-1}\|_2^2 - \frac{\delta_l}{2} \|\wedge_l\|_2^2 \|W_l\|_2^2 \|\Delta_{l-1}\|_2^2 \leq \left(\frac{1}{2\delta_l} + |v_l|\right) \|\Delta_{l-1}\|_2^2 -$$
$$\frac{\delta_l}{2} [(\rho(W_l) + \sigma) \|\Delta_{l-1}\|_2^2] \approx \left[\frac{1}{2\delta_l} + |v_l| - \frac{\delta_l}{2} \rho(W_l)\right] \|\Delta_{l-1}\|_2^2$$

In an exemplary embodiment, for the immediately preceding relationship to hold, the term inside the bracket can be positive to provide a measure for spectral regularization of the weights between each two hidden layers of a DNN. Therefore, for layer l, the following holds:

$$\rho(W_l) \le \frac{1}{\delta_l^2} + \frac{2|v_l|}{\delta_l}.$$

In an exemplary embodiment, the immediately preceding relationship shows a relationship between the spectral norm of the weight matrix at the layer l and incrementally finite-gain $L_2$ stability of the layer through the hyper-parameter $\delta_l$, that can be positive for the layer to be incrementally finite-gain stable. Further, this relationship can hold for $L_2$-norm.

In an exemplary embodiment, this relationship can be implemented for each layer during the training of the network. If this relationship is met for each layer, then it can be posited that the entire neural network is stable and robust. The extension of this relationship to convolutional layers can follow in a similar pattern given that the transformations before the activation functions at the convolutional layers are linear and that the same isomorphism may be exploited to have the same final relationships as given in the relationship.

In an exemplary embodiment, the transformation occurring at a convolutional layer l for output feature i with any padding and stride design can be defined as, $$\phi_{l,i}^{conv}(u_{l-1,i}) = \sum_{j=1}^{M_{l-1}} f_{j,i} * u_{l-1,j,i} + b_{l,i},$$

where each $f_{j,i}$ can be a filter applied to the input feature and each $u_l \ 1_{j,i}$ can be an input feature map from the previous layer. $b_{l,i}$ can be an appropriately shaped biased tensor adding the same value to every element resulting from the convolutions. $M_{l-1}$ can be the number of feature maps in the previous layer.

In an exemplary embodiment, the transformation occurring at a convolutional layer l can be represented as a matrix-vector multiplication by defining, $U_{l-1,i}=[ul_{-1}, 1, i, \ldots, u_{l-1}, M_{l-1}, i]$ and the filter coefficients can be represented in the form of a doubly block circulant matrix. The transformation process is further described in Henry Gouk, Eibe Frank, Bernhard Pfahringer, and Michael Cree. Regularisation of neural networks by enforcing lipschitz continuity. arXiv preprint arXiv:1804.04368, 2018, and Hanie Sedghi, Vineet Gupta, and Philip M Long, the singular values of convolutional layers, arXiv preprint arXiv: 1805.10408, 2018, which are incorporated by reference in their entirety.

In an exemplary embodiment, if $F_{j,i}$ is a matrix that encompasses convolution of $f_{j,i}$ with the j-th feature map in a vector form, then to represent convolutions associated with different input feature maps and the same output feature map i.e., $f_{j,i}$'s over $M_{l-1}$ input features, the filter matrices can be horizontally concatenated to define $F_i=[F_{1,i}, F_{2,i}, \ldots, F_{Ml-1,i}]$. Then a complete transformation can be performed by a convolutional layer to generate $M_l$ output feature maps that can be represented as $h_l(U_{l-1})=h_l(W \ U_{l-1}+B_l)$ where, $$W = \begin{bmatrix} F_{1,1} & \cdots & F_{M_{l-1},1} \\ \vdots & \ddots & \vdots \\ F_{1,M_l} & \cdots & F_{M_{l-1},M_l} \end{bmatrix}$$

where the vector $B_l$ is the larger version of $b_i^l$'s for all input feature maps and $U_{l-1}=[U_{l-1}, 1, \ldots, U_{l-1}, M_{l-1}]$. Consequently, the spectral norm of W can meet the conditions given in the previously defined relationship for the layer l to be IIFOFP and finite-gain $L_p$-stable with bounded incremental outputs.

In an exemplary embodiment, a power iteration method can be used to estimate the spectral norm of the weight matrix at a specific layer. The pooling layers inside a DNN do not affect the conic behavior of the sub-systems given the properties of conic systems. Specifically, depending on how the pooling layer is designed, an adjustment can be made to the $L_2$ norm of the output changes for the sub-system containing the pooling layer. Max (average) pooling can decrease the $L_2$ norm of the changes. The pooling layer can translate the sub-system into another conic system with appropriate adjusted indices.

In an exemplary embodiment, $v_l$ and $\delta_l$ can be design hyper-parameters to be selected before training starts. The only conditions placed on the hyper-parameters are that $\delta_l$ should be positive and that $\delta_l \times v_l \le 1/4$. $\delta_l$ and $v_l$ can take the same value for all the layers of the DNN or can be layer specific given the desired performance and robustness criteria.

In an exemplary embodiment, in a cascade interconnection of nonlinear systems as previously described, if each sub-system (layer) $H_i$ for i=1, n is IIFOFP with their respective $v_i$ and $\delta_i$ where $\delta_i>0$. That is, for any two incremental inputs $u_{i2}, u_{i1}$ to the layer a storage function for the layer can be: $\omega(u_{i2}-u_{i1}, y_{i2}-y_{i1})=(u_{i2}-u_{i1})^T(y_{i2}-y_{i1})-\delta_i(y_{i2}-y_{i1})^T(y_{i2}-y_{i1})-v_i(u_{i2}-u_{i1})^T(u_{i2}-u_{i1})$. In such a case, the entire DNN (the cascade of hidden layers) can also be IIFOFP with the overall indices v and $\delta$ and the supply function: $\omega(u_2-u_1, y_2-y_1)=(u_2-u_1)^T(y_2-y_1)-\delta(y_2-y_1)^T(y_2-y_1)-v(u_2-u_1)^T(u_2-u_1)$, where $u_1$ and $u_2$ are the initial incremental inputs to the DNN and $y_1$ and $y_2$ are the respective final outputs produced by the network.

In an exemplary embodiment, the supply function can be represented as $V_i=(u_{i2}-u_{i1})^T(y_{i2}-y_{i1})-\delta_i(y_{i2}-y_{i1})^T(y_{i2}-y_{i1})-v_i(u_{i2}-u_{i1})^T(u_{i2}-u_{i1})$, then for robustness, $$0 <= \sum_{i=1}^{N} V_i <= (u_2-u_1)^T(y_2-y_1) - \delta(y_2-y_1)^T(y_2-y_1) - v(u_2-u_1)^T(u_2-u_1).$$

The summation $$\sum_{i=1}^{N} V_i$$

can be positive if the sub-layers are trained according to the presently disclosed techniques.

In an exemplary embodiment, where the matrices are defined as follows:

$$A_1 = \begin{bmatrix} -v_1 & 0 & \cdots & 0 & -\frac{1}{2} \\ \frac{1}{2} & -v_2 & \ddots & & 0 \\ \vdots & \ddots & \ddots & \ddots & \vdots \\ 0 & \cdots & \frac{1}{2} & -v_n & 0 \\ 0 & \cdots & 0 & \frac{1}{2} & \delta \end{bmatrix},$$

$$A_2 = \begin{bmatrix} v & 0 & \cdots & 0 & -\frac{1}{2} \\ \frac{1}{2} & -\delta_1 & \ddots & & 0 \\ 0 & \frac{1}{2} & -\delta_2 & \ddots & \vdots \\ \vdots & \ddots & \ddots & \ddots & 0 \\ 0 & \cdots & 0 & \frac{1}{2} & -\delta_n \end{bmatrix},$$

the supply function $V_i$ relationship can be defined as $[u^T y^T](A_1^T + A_2)[u^T y^T]^T = [u^T u^T]A[u^T y^T]^T$ where:

$$A = A_1^T + A_2 = \begin{bmatrix} v - v_1 & \frac{1}{2} & 0 & \cdots & -\frac{1}{2} \\ \frac{1}{2} & -\delta_1 - v_2 & \frac{1}{2} & \cdots & 0 \\ \vdots & \ddots & \ddots & \ddots & \vdots \\ 0 & \cdots & \frac{1}{2} & -\delta_{n-1} - v_n & \frac{1}{2} \\ -\frac{1}{2} & 0 & \cdots & \frac{1}{2} & \delta - \delta_n \end{bmatrix}$$

In an exemplary embodiment, if $-A$ is quasi-dominant, then $A$ can be negative-dominant and $[u^T u^T]A[u^T y^T]^T \leq 0$ and as a result the entire DNN is IIFOFP with indices $\delta$ and $v$. For this to hold, the only condition is for the hyper-parameters to be selected such that the matrix $-A$ is quasi-dominant. For the case that we are interested in, we need the hyper-parameters to be selected such that $\delta > 0$, $v > 0$ and $\delta_i > 0$ for $i = 1, \ldots, N$ and $v_i$ for $i = 1, \ldots, N$ are selected such that the aforementioned conditions are met. This means that one needs to carefully select the diagonal entries of A so that the matrix is quasi-dominant and the entire framework is IFOFP with $\delta > 0$ and $v > 0$ and consequently robust against adversarial attacks.

In an exemplary embodiment, any $\delta_i$ or $v_i$ for any hidden layer inside the DNN can take negative or positive values, as long as the matrix $-A$ stays quasi-dominant so that the entire network stays stable and robust. However, a negative index $\delta_i$ for a layer i can imply that layer i is less robust against adversarial attacks.

In an exemplary embodiment, the first and last hidden layer of the DNN can have the largest effect on the robustness of the entire network. For matrix A to be quasi-dominant, $\delta_n > \delta$ should be met. This implies that $\delta$ can only take values between 0 to $\delta_n$. Similarly, v can only take a value between 0 to $v_l$. This also indicates that the weights for the first layer of the deep learning model should be trained such that $v_l > 0$.

In an exemplary embodiment, an exact relationship between the incremental changes injected into the input signals of a DNN and their effects on the output of the deep learning model can be characterized by quantifying a measure of robustness for the entire DNN. The worst case possible scenario for the negative effects of an adversarial attack can be shown by characterizing an upper-bound for the output variations produced by the model given the attack strength $\Delta$. The output variations of the DNN can be bounded by the input variations caused by the attack.

In an exemplary embodiment, in a cascade interconnection of nonlinear systems as previously described, if each sub-system (layer) $H_i$ for $i = 1, \ldots, n$ is IIFOFP with their respective $v_i$ and $\delta_i$, and the DNN is trained according to the presently disclosed techniques, the entire network is IIFOFP with its respective indices v and $\delta$ and the storage function $w(x, y) = (u_2 - u_1)^T(y_2 - y_1) - \delta(y_2 - y_1)^T(y_2 - y_1) - v(u_2 - u_1)^T(u_2 - u_1)$ where $\delta > 0$.

In an exemplary embodiment, the variations in the final output of the entire DNN ($\Delta$) can be upper-bounded (limited) by the variations in the input signal ($\in$) through the following relation (hereinafter Corollary 2), $$\|\Delta^{(N)}\|_2^2 \leq \left(\frac{1}{2\delta^2} + \frac{2v}{\delta}\right)\|\Delta^{(1)}\|_2^2,$$

where the design parameter $\delta$ and v are both positive.

In an exemplary embodiment, the effects of the adversarial attack can be represented as $\Delta^1$ and the respective changes occurring at the output of the DNN can be represented as $\Delta^N$. Therefore, $\Delta^{(N)} = y_2 - y_1$ can represent the changes in the output of the deep learning model, $\Delta^{(1)} = u_1 + \Delta^{(1)} - u_1$ can represent the changes in the input of the deep learning model injected by the attacker, such that:

$$0 \leq (\Delta^{(1)})^T \Delta^{(N)} - (\Delta^{(N)})^T(\delta I)\Delta^{(N)} - (\Delta^{(1)})^T(vI)\Delta^{(1)}$$

Given that $\delta > 0$ and $v > 0$ and for norm of 2 ($p = 2$), the above equation can be defined as:

$$0 \leq \left(\frac{1}{2\delta} + v\right)\|\Delta^{(1)}\|_2^2 - \frac{\delta}{2}\|\Delta^{(N)}\|_2^2 \text{ or}$$

$$\|\Delta^{(N)}\|_2^2 \leq \left(\frac{1}{2\delta^2} + \frac{2v}{\delta}\right)\|\Delta^{(1)}\|_2^2.$$

In an exemplary embodiment, for well-known attacks FGSM, PGDM and WRM with $0 < \in < 1$, $\|\Delta^{(1)}\|_2^2 \leq \in$ and the exact changes in the output of the DNN can be characterized in terms of $\in$ as:

$$\|\Delta^{(N)}\|_2^2 \leq \left(\frac{1}{2\delta^2} + \frac{2v}{\delta}\right)\|\Delta^{(1)}\|_2^2 \leq \left(\frac{1}{2\delta^2} + \frac{2v}{\delta}\right)\in, \text{ or } \|\Delta^{(N)}\|_2 \leq \sqrt{\left(\frac{1}{2\delta^2} + \frac{2v}{\delta}\right)\in}$$

In an exemplary embodiment, the bound given in previously described Corollary 2 can also be retrieved for each layer of the DNN, if the layer is regularized to have $\delta_i > 0$. This can indicate that the regularization scheme based on the spectral norm of the matrix weights at each layer also protects the DNN against adversarial noise injected into the inputs between hidden layers. For the layer i, this relation turns into $$\|\Delta^{(N)}\|_2^2 \leq \left(\frac{1}{2\delta^2} + \frac{2v}{\delta}\right)\|\Delta^{(1)}\|_2^2$$

where δ and ν are determined by the spectral regularization enforced at the layer i.

In an exemplary embodiment, the combination of the hyper-parameters for each layer γ with $$\gamma_l = \frac{1}{\delta_l^2} + \frac{2|\nu|}{\delta_l}$$

can represent each layer l=1, 2, . . . N inside the DNN and γ=

$$\gamma = \frac{1}{\delta_l} + \frac{2|\nu|}{\delta_l}$$

can represent the entire DNN. For example, if a neural net has three layers (one input, one hidden and one output layer producing two nonlinear sub-system each layer is trained to be IIFOFP with $\nu_i$=0.16 and $\delta_i$=1.5 for i=1, 2 (1.5+0.16>−1), then the matrix $$-A = \begin{bmatrix} \nu_1 - \nu & -\frac{1}{2} & 0 & +\frac{1}{2} \\ -\frac{1}{2} & \nu_2 + \delta_1 & -\frac{1}{2} & 0 \\ 0 & -\frac{1}{2} & \nu_2 + \delta_1 & -\frac{1}{2} \\ \frac{1}{2} & 0 & -\frac{1}{2} & \delta_n - \delta \end{bmatrix}$$

can be diagonally dominant if ν<0.16 and δ<1.5. This can lead to the following upper-bound for DNN, if ∈=0.3, ν=0.15 and δ=1.4, $\|\Delta^{(N)}\|_2 \leq 0.685$.

Therefore, as shown in the immediately preceding example, if the DNN is trained as proposed, the ability of the adversary to change the output behavior can be significantly curtailed. Our experiments show that the above bound is quite conservative. As such, if the DNN is designed to be Lyapunov robust, the change in the output of the network under an adversarial attack can be quite small, indicating the efficacy the disclosed techniques.

In an exemplary embodiment, the presently disclosed techniques can be utilized to train a DNN on any operating system and computational platform, including CPUs, TPUs, and GPUs. Further the presently disclosed techniques can be applied to any deep learning network including forward neural networks, convolutional neural networks, and recurrent neural networks.

Figure 1:
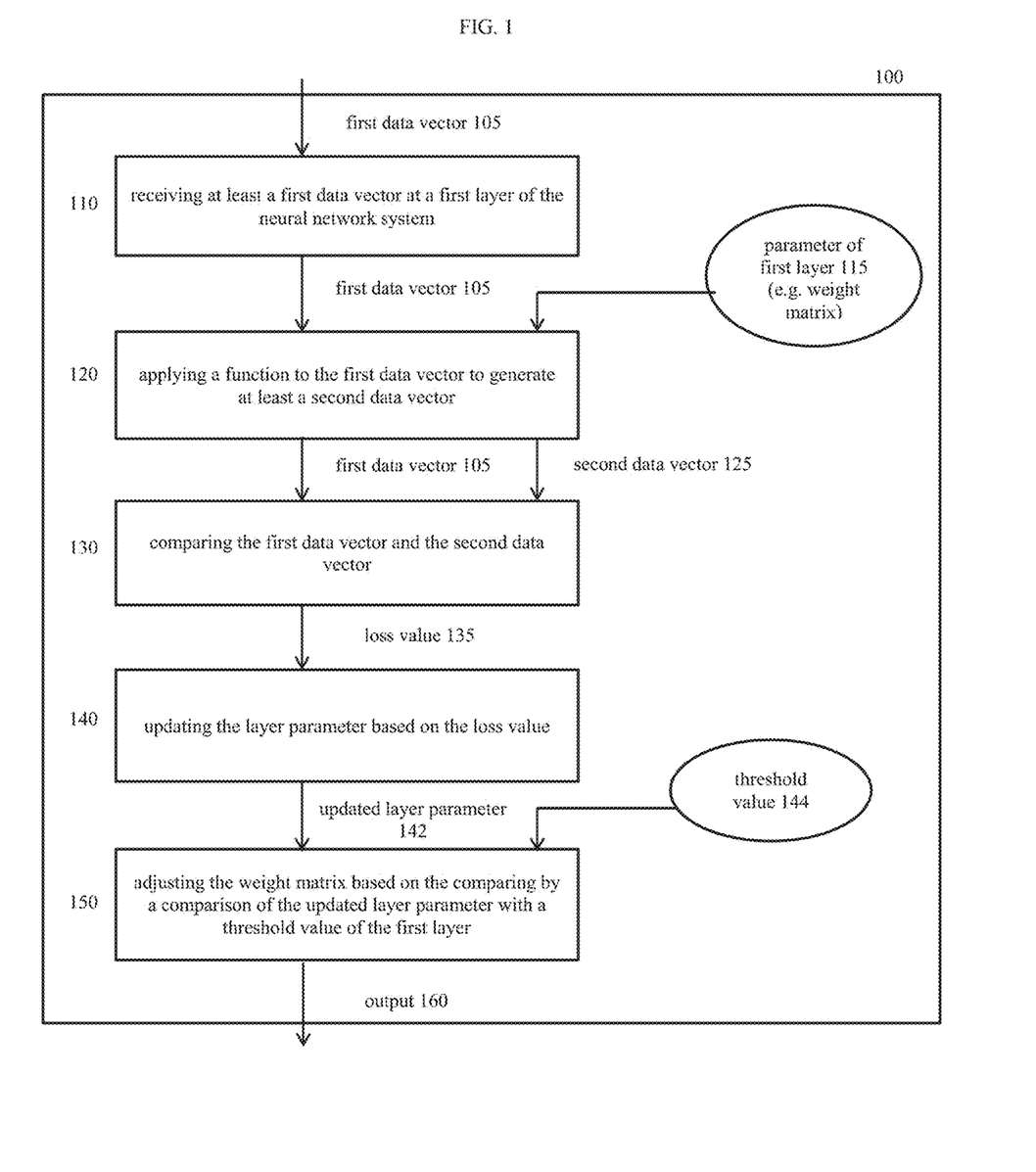
FIG. 1 illustrates an exemplary method for training a neural network system.

FIG. 1 illustrates an exemplary flowchart of a computer-implemented method 100 for training a neural network system based on the aforementioned disclosed techniques. In an exemplary embodiment, the method 100 can include a step 110 of receiving at least a first data vector 105 at a first layer of the neural network system.

A data vector as used herein can be, but is not limited to, an image, a text file, a sound file, numerical data, a signal, a video recording, or any sequence of one or more symbols given meaning by an act of interpretation. In an exemplary embodiment, the first data vector 105 can be a vector matrix with a value of [0.593, 0.596].

In an exemplary embodiment, the method 100 can include a step 120 of applying a function to the first data vector 105 to generate at least a second data vector 125, wherein the function is based on a layer parameter 115 of the first layer that includes at least a weight matrix of the first layer. For example, the layer parameter 115 can be a weight matrix with a value of [0.90, 0.95, 1, 1.05].

In an exemplary embodiment, a function as used herein can be an activation function of a layer of a neural network system that defines the output of that layer based on an input or set of inputs. This output can then be used as input for the next layer and so on until, for example, a desired solution to the original problem is found. The function can map the resulting values into the desired range, such as between 0 to 1 or −1 to 1, etc. (depending upon the choice of activation function). For example, the activation function can be a logistic function that defines the second data vector 125.

In an exemplary embodiment, a logistic function $(1/e^{-(\Sigma w_j i_j)})$, where w represents the layer parameter, i represents the input vector, and j can be a number from 1 to n) applied to the first data vector 105 with a value of [0.593, 0.596] in combination with the layer parameter 115 with a value of [0.90, 0.95, 1, 1.05] to generate the second data vector 125 as described in step 120. In this case, the value of the second data vector 125 would be [0.751, 0.772] by applying a logistic function to the first data vector 105 with a value of [0.593, 0.596] and layer parameter 115 with a value of [0.90, 0.95, 1, 1.05].

In an exemplary embodiment, the method 100 can include a step 130 of comparing the first data vector 105 and the second data vector 125 to obtain a loss value 135 that represents a difference between the first data vector 105 and the second data vector 125. For example, the first data vector 105 with a value [0.593, 0.596] and the second data vector 125 with a value [0.751, 0.772] can be compared using a function (e.g., a mean squared error function) to obtain a loss value 135, as described in step 130. The loss value 135 in such a case would be ½ (0.593−0.751+0.898)²+½(0.596−0.772+0.39)²=0.297.

In an exemplary embodiment, the method 100 can include a step 140 of updating the layer parameter 115 based on the loss value 135. The layer parameter 115 can be updated such that an actual output of the layer is caused to be closer to a target output, thereby minimizing an error for each node, layer, and the neural network system as a whole.

In an exemplary embodiment, the layer parameter 115 with a value of [0.90, 0.95, 1, 1.05], as noted above can be updated based on the loss value 135 with a value of 0.297 using the backward pass steps described in pages 4-6 of the article by Matt Mazur called "A Step by Step Backpropagation Example". The article is incorporated herein in its entirety by reference, and can be found at https://mattmazur.com/2015/03/17/a-step-by-step-backpropagation-example/. In this case, the updated weight matrix has the value [0.85, 0.90, 1.01, 1.06].

In an exemplary embodiment, the method 100 can include a step 150 of adjusting the layer parameter 115 based on a comparison of the updated layer parameter 142 with a threshold value 144 of the first layer. For example, the step 150 can include comparing a spectral norm of the weight matrix of the updated layer parameter 142 with the threshold value 144. The spectral norm of the [0.85, 0.90, 1.01, 1.06] is 1.91 and it can be calculated using any of the known algorithms. In an exemplary embodiment, the threshold value 144 for the comparing can be 1.

In an exemplary embodiment, the step 150 of adjusting the layer parameter can include dividing weights of the weight matrix by an amount. In this case, [0.85, 0.90, 1.01, 1.06] can be divided by the spectral norm 1.91 resulting in a matrix [0.44, 0.47, 0.52, 0.55], such that the spectral norm of the updated matrix is equal to 1, the threshold value 144.

In an exemplary embodiment, the step 110 can include receiving the first data vector 105 and an associated first label. A label as used herein can be a target value or ideal output that the method 100 should predict given an input. For example, for the first data vector 105 with a value [0.593, 0.596], the label can be 0.01 and 0.09.

In an exemplary embodiment, the step 120 can include applying the function to the first data vector 105 to generate the second data vector 125 and an associated second label. The step 130 can include comparing the first data label and the second data label. This comparison can be made as previously described in step 130.

Figure 2:
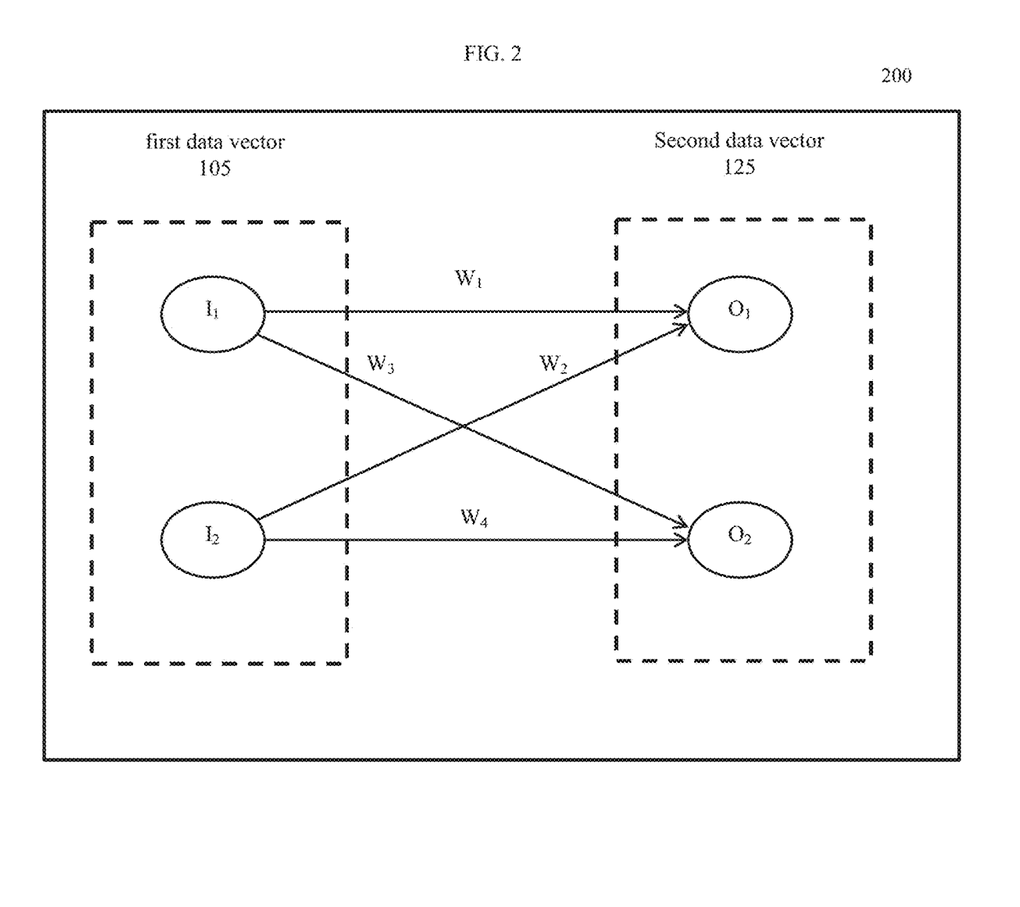
FIG. 2 shows an exemplary structure of a neural network system.

FIG. 2 shows a basic structure of an exemplary neural network system, which can be based on an exemplary embodiment of the foregoing steps of the method 100. FIG. 2 shows network parameters i, w, and o, where i represents the initial input vectors (e.g., $i_1$, $i_2$), w represents weights (e.g., $w_1$, $w_2$, $w_3$, $w_4$), o represents the output (e.g., $o_1$, $o_2$). The first data vector 105 can include ($i_1$, $i_2$), the layer parameter 115 can include ($w_1$, $w_2$, $w_3$, $w_4$) and the second data vector 125 can include ($o_1$, $o_2$).

In various exemplary embodiments, the number of the various network parameters can vary. For example, there could be 1, 2, . . . , or n initial vectors, hidden layers, biases, weights, etc. In another example, there could be one initial vector, zero biases, zero hidden layers, one output layer, one weight value, etc. In an exemplary embodiment, the layer parameter 115 can include a bias of the first layer, as described in the previously referenced Matt Mazur's article on step by step backpropagation.

In an exemplary embodiment, the presently disclosed techniques for training DNNs can augment a backpropagation training method without adding any computational cost. After each iteration of backpropagation, the condition on spectral norm of the weights can be checked and, if the condition is not met, a small adjustment can be made.

In an exemplary embodiment, the exemplary neural network system can include multiple sequential layers. In such a case, the method 100 can include a step of inputting an output of each layer of the multiple sequential layers to a subsequent layer. The selection of a number of the multiple sequential layers can be based on at least a processing capability of the neural network system. For example, a higher number of multiple sequential layers can be selected for a neural network system with a high processing capability than for a neural network system with a low processing capability.

In an exemplary embodiment, selecting an amount of the adjusting in step 150 can be based on a processing capability of the neural network system. For example, for a neural network system with a high processing capability a greater amount of adjusting can be done per iteration than for a neural network system with a low processing capability.

Figure 3:
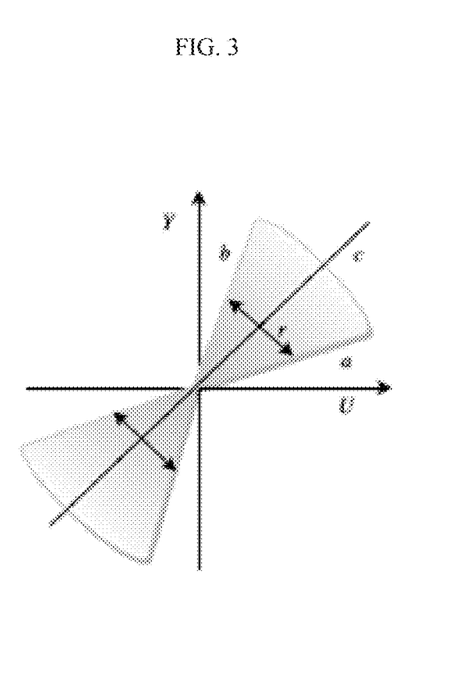
FIG. 3 depicts an exemplary interior conic behavior of a nonlinear system.

FIG. 3 shows an exemplary depiction of the interior behavior of a nonlinear system. In an exemplary embodiment, Lyapunov stability and robustness properties of passive nonlinear systems can be connected to the conicity behavior of the input-output mapping of these systems. A nonlinear system can be input-output stable, meaning the nonlinear system always produces bounded outputs for any bounded input fed to it, and input-output robust, meaning the nonlinear system produces outputs that are insensitive to small changes injected to the system, if it exhibits a conic behavior.

In an exemplary embodiment, a conic behavior can be defined as a behavior represented in the mapping between the inputs injected into the system and their respective outputs produced by the system. More specifically, a nonlinear transformation can be an interior conic if the mapping between the input and its respective output fits inside a conic sector on the plane. That is, a conic nonlinear numerical transformation in the Hilbert space can be one whose input u and output y are restricted to some conic sector of the U×Y inner product space as shown in FIG. 3. This behavior can be encouraged for each individual layer of a DNN so the outputs of the activation functions become insensitive to small changes in the input.

In an exemplary embodiment, the presently disclosed techniques bound the output changes based on the changes in the input as depicted in FIG. 3, and make the numerical transformations happening at each layer of the DNN insensitive to small changes in the input. In other words, the pairs ($\in$, $\Delta$) can be instantaneously confined to a sector of the plane as given in FIG. 3 ($\Delta$ represents the change in output given $\in$).

In an exemplary embodiment, a conic behavior as shown in FIG. 3 can be defined by the center line of the cone c and the radius r. A relation H in R can be interior conic, if there are real constants r≥0 and c for which the inequality, $\|y-cu\|_{L_p} \leq r\|u\|_{L_p}$ can be satisfied.

In an exemplary embodiment, for $$u = \Delta^{(1)}, \; y = \Delta^{(N)}, \; c = \frac{a+b}{2} \text{ and } r = \frac{b-a}{2}$$

where a and b are the slopes of the lower bound and upper bound of the cone, and c and r are the center and radius of the cone, as shown in FIG. 3, the following for the $L_2$ norm (p=2) holds:

$$\left(\Delta^{(N)} - c\Delta^{(1)}\right)^T \left(\Delta^{(N)} - c\Delta^{(1)}\right) \leq r^2 \left(\Delta^{(1)}\right)^T \Delta^{(1)} \rightarrow$$

$$\left(\Delta^{(N)} - \left(\frac{a+b}{2}\right)\Delta^{(1)}\right)^T \left(\Delta^{(N)} - \left(\frac{a+b}{2}\right)\Delta^{(1)}\right) \leq \left(\frac{b-a}{2}\right)^2 \left(\Delta^{(1)}\right)^T \Delta^{(1)} \rightarrow$$

$$\left(\frac{a+b}{2}\right)^2 \left(\Delta^{(1)}\right)^T \Delta^{(1)} - (a+b)\left(\Delta^{(1)}\right)^T \Delta^{(N)} + \left(\Delta^{(N)}\right)^T \Delta^{(N)} \leq \left(\frac{b-a}{2}\right)^2 \left(\Delta^{(1)}\right)^T$$

$$\Delta^{(1)} \rightarrow 0 \leq \left(\Delta^{(1)}\right)^T \Delta^{(N)} - \left(\frac{ba}{b+a}\right)\left(\Delta^{(1)}\right)^T \Delta^{(1)} - \left(\frac{1}{a+b}\right)\left(\Delta^{(N)}\right)^T \Delta^{(N)}.$$

Therefore, by selecting $$\delta = \left(\frac{1}{a+b}\right) \text{ and } v = \left(\frac{ba}{b+a}\right),$$

the output changes can be bounded based on the changes in the input as depicted in FIG. 3 and the numerical transformations can be made at each layer of the DNN insensitive to small changes in the input.

In an exemplary embodiment, a positive v can imply a>0 with a larger v implying a larger a and a larger distance between the lower-bound of the cone and the U axis. And a positive δ can imply b>0 with a larger δ implying a smaller b and a larger distance between the slope of the upper-bound of the cone and the Y axis. In other words, the pairs ($\Delta^{(1)}$, $\Delta^{(N)}$) can be instantaneously confined to a sector of the plane as shown in FIG. 3.

In an exemplary embodiment, the presently disclosed approach can provide strong theoretical explanations for a leaky ReLu activation function with a $\in (0, 1)$ that can bring robustness to the deep neural network. Further discussion on this can be found in Eric Wong and Zico Kolter, "Provable defenses against adversarial examples via the convex outer adversarial polytope", *In International Conference on Machine Learning*, pages 5283-5292, 2018, and Haifeng Qian and Mark N Wegman, "L2-nonexpansive neural networks", arXiv preprint arXiv: 1802.07896, 2018, which are incorporated in their entirety by reference.

The presently disclosed approach is also resilient against intermediate level attacks described in Qian Huang, Zeqi Gu, Isay Katsman, Horace He, Pian Pawakapan, Zhiqiu Lin, Serge Belongie, and Ser-Nam Lim, "Intermediate level adversarial attack for enhanced transferability", arXiv preprint arXiv: 1811.08458, 2018, which is incorporated in its entirety by reference.

Background discussion on the conic interpretation of the presently disclosed techniques can be found in 1) Valentina Zantedeschi, Maria-Irina Nicolae, and Ambrish Rawat, "Efficient defenses against adversarial attacks", *In Proceedings of the 10th ACM Workshop on Artificial Intelligence and Security*, pages 39-49. ACM, 2017; 2) Tsui-Wei Weng, Huan Zhang, Hongge Chen, Zhao Song, Cho-Jui Hsieh, Duane Boning, Inderjit S Dhillon, and Luca Daniel, "Towards fast computation of certified robustness for relu networks", arXiv preprint arXiv: 1804.09699, 2018; and 3) Huan Zhang, Tsui-Wei Weng, Pin-Yu Chen, Cho-Jui Hsieh, and Luca Daniel, "Efficient neural network robustness certification with general activation functions", *In Advances in Neural Information Processing Systems*, pages 4939-4948, 2018. All of these are incorporated in their entirety by reference.

Figure 4:
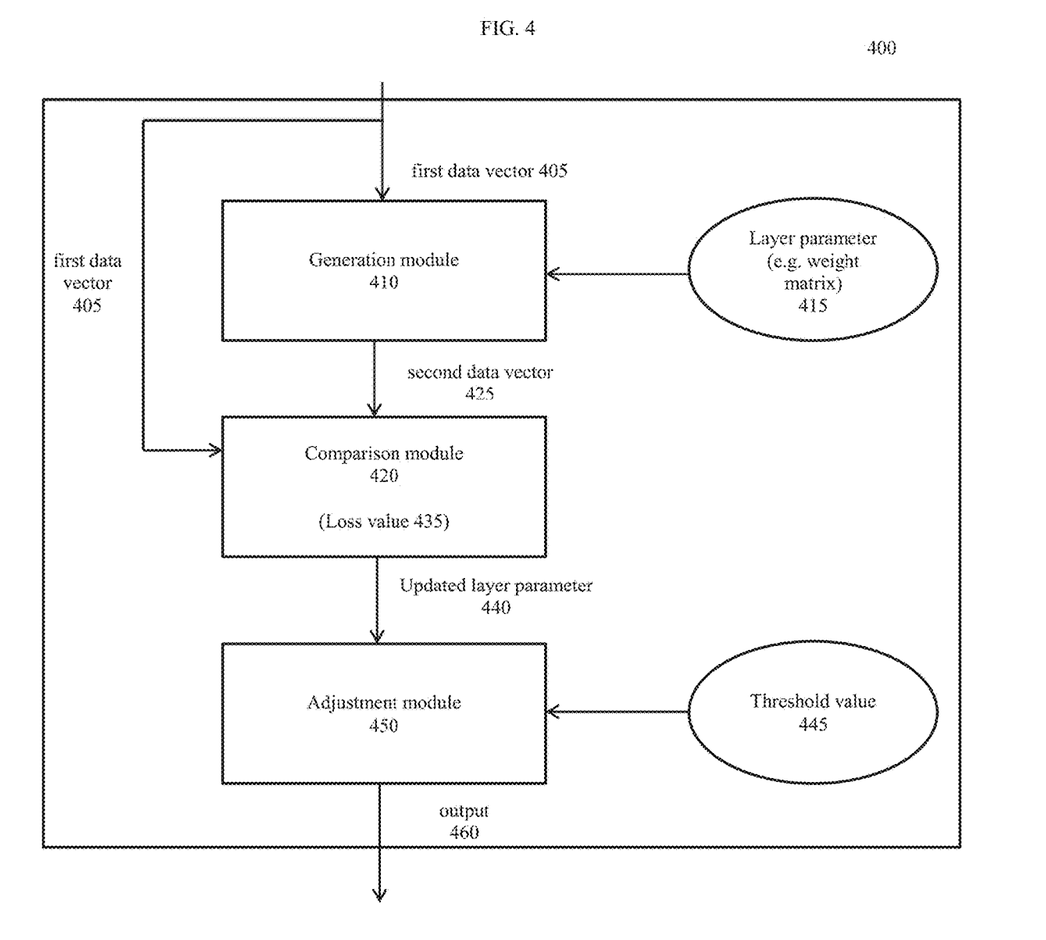
FIG. 4 shows an exemplary training system for training a neural network system.

FIG. 4 shows an exemplary training system 400 for training a neural network system. In an exemplary embodiment, the system 400 can include a generation module 410 configured to apply a function to a first data vector 405 to generate at least a second data vector 425. The applying of the function can be based on the previously described step 120. This function can be based on a layer parameter 415 of a first layer of a neural network system, the layer parameter 415 including at least a weight matrix of the first layer.

In an exemplary embodiment, the system 400 can include a comparison module 420 configured to at least compare the first data vector 405 and the second data vector 425 to obtain a loss value 435 that represents a difference between the first data vector 405 and the second data vector 425, as previously described in step 130. The layer parameter 415 can be updated based on the loss value 435, as previously described in step 140.

In an exemplary embodiment, the system 400 can include an adjustment module 430 configured to adjust the layer parameter 115 based on a comparison of the updated layer parameter with a threshold value of the first layer, as previously described in step 150. The output 440 can include the adjusted values of the layer parameter.

In an exemplary embodiment, the comparison module 420 can be configured to compare the weight matrix with the threshold value by comparing a spectral norm of the weight matrix of the first layer with the threshold value, as previously described in method 100. The adjustment module 430 can be configured to adjust the weight matrix by dividing weights of the weight matrix by an amount, as previously described in method 100.

In an exemplary embodiment, the system 400 can have only one layer. In another exemplary embodiment, the system 400 can have multiple sequential layers, wherein an output of each layer of the multiple sequential layers is an input to a subsequent layer, and a number of the multiple sequential layers can be based on at least a processing capability of the neural network system, as previously described in method 100.

A person having ordinary skill in the art would appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, one or more of the disclosed modules can be a hardware processor device with an associated memory.

A hardware processor device as discussed herein can be a single hardware processor, a plurality of hardware processors, or combinations thereof. Hardware processor devices can have one or more processor "cores." The term "non-transitory computer readable medium" as discussed herein is used to generally refer to tangible media such as a memory device.

Various embodiments of the present disclosure are described in terms of an exemplary computing device. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

A hardware processor, as used herein, can be a special purpose or a general purpose processor device. The hardware processor device can be connected to a communications infrastructure, such as a bus, message queue, network, multi-core message-passing scheme, etc. An exemplary computing device, as used herein, can also include a memory (e.g., random access memory, read-only memory, etc.), and can also include one or more additional memories. The memory and the one or more additional memories can be read from and/or written to in a well-known manner. In an embodiment, the memory and the one or more additional memories can be non-transitory computer readable recording media.

Data stored in the exemplary computing device (e.g., in the memory) can be stored on any type of suitable computer readable media, such as optical storage (e.g., a compact disc, digital versatile disc, Blu-ray disc, etc.), magnetic tape storage (e.g., a hard disk drive), or solid-state drive. An operating system can be stored in the memory.

In an exemplary embodiment, the data can be configured in any type of suitable database configuration, such as a relational database, a structured query language (SQL) database, a distributed database, an object database, etc. Suitable configurations and storage types will be apparent to persons having skill in the relevant art.

The exemplary computing device can also include a communications interface. The communications interface can be configured to allow software and data to be transferred between the computing device and external devices. Exemplary communications interfaces can include a modem, a network interface (e.g., an Ethernet card), a communications port, a PCMCIA slot and card, etc. Software and data transferred via the communications interface can be in the form of signals, which can be electronic, electromagnetic, optical, or other signals as will be apparent to persons having skill in the relevant art. The signals can travel via a communications path, which can be configured to carry the signals and can be implemented using wire, cable, fiber optics, a phone line, a cellular phone link, a radio frequency link, etc.

Memory semiconductors (e.g., DRAMs, etc.) can be means for providing software to the computing device. Computer programs (e.g., computer control logic) can be stored in the memory. Computer programs can also be received via the communications interface. Such computer programs, when executed, can enable the computing device to implement the present methods as discussed herein. In particular, the computer programs stored on a non-transitory computer-readable medium, when executed, can enable a hardware processor device to implement the methods illustrated by FIGS. 2 and 4, or similar methods, as discussed herein. Accordingly, such computer programs can represent controllers of the computing device.

Where the present disclosure is implemented using software, the software can be stored in a computer program product or non-transitory computer readable medium and loaded into the computing device using a removable storage drive or communications interface. In an exemplary embodiment, any computing device disclosed herein can also include a display interface that outputs display signals to a display unit, e.g., LCD screen, plasma screen, LED screen, DLP screen, CRT screen, etc.

It will be appreciated by those skilled in the art that the present disclosure can be embodied in other specific forms without departing from the spirit or essential characteristics thereof. The presently disclosed embodiments are therefore considered in all respects to be illustrative and not restrictive. The scope of the disclosure is indicated by the appended claims rather than the foregoing description, and all changes that come within the meaning, range, and equivalence thereof are intended to be embraced therein.

What is claimed is:

1. A computer-implemented method for training a neural network system, the method comprising:
   (a) receiving at least a first data vector as an input at a first layer of multiple sequential layer of the neural network system and a target output vector for the neural network system;
   (b) setting one or more control parameters of the first layer to specified values and combining the one or more control parameters to determine one or more bounding values on a spectral norm of the first layer weight matrix;
   (c) adjusting first layer weight matrix values in order to impose Lyapunov stability for the first layer non-linear output by dividing the first layer weight matrix values by a stability parameter such that the spectral norm of the first layer weight matrix stays bounded by the one or more bounding values;
   (d) generating a second data vector comprising the first layer non-linear output by applying a non-linear function to the first data vector, wherein the function uses the adjusted first layer weight matrix values;
   (e) repeating, at each subsequent layer in the multiple sequential layers of the neural network system, steps (a) through (d), wherein the first data vector input into each subsequent layer corresponds to the second data vector that is output from the immediately preceding layer in the sequence of multiple sequential layers;
   (f) comparing the target output vector and the second data vector that is output from the final layer in the sequence of multiple sequential layers to obtain a loss value that represents a difference between an inference of the multiple sequential layers of the neural network system given the first data vector as the input to the first layer of the multiple sequential layers of the neural network system and the target output vector; and
   (g) updating the weight matrix values and bias values of each layer in the neural network system based on the loss value.

2. The method of claim 1, wherein the function is an activation function that generates the second data vector from the first data vector.

3. The method of claim 1, comprising:
   selecting a subset of the multiple sequential layers based on at least a processing capability of the neural network system.

4. The method of claim 1, comprising:
   selecting an amount of the adjusting based on a processing capability of the neural network system.

5. The method of claim 1, wherein each of the first data vector, the target output vector, and the second data vector is one of an image, numerical data, a text file, a sound file, a signal, a one-dimensional matrix, or a video recording.

6. A neural network system trained by the method of claim 1.

7. The method of claim 1, wherein the loss value is associated with distortion relative to a classification of the first data vector.

8. A training system for training a neural network system, the training system comprising:
   an interface configured to (a) receive a first data vector as an input at a first layer of multiple sequential layers of the neural network system and a target output vector for the neural network system;
   a generation module configured to: (b) set one or more control parameters of the first layer to specified values and combine the one or more control parameters to determine one or more bounding values on a spectral norm of the first layer weight matrix;
   an adjustment module configured to: (c) adjust first layer weight matrix values to impose Lyapunov stability for a first layer non-linear output by dividing the first layer weight matrix values by a stability parameter such that the spectral norm for the first layer weight matrix stays bounded by the one or more bounding values;
   the generation module further configured to: (d) generate a second data vector comprising the first layer non-linear output by applying a non-linear function to the first data vector, wherein the function uses the adjusted first layer weight matrix values;
   the interface, generation module, and the adjustment module being further configured to repeat, at each subsequent layer in the multiple sequential layers of the neural network system, operations (a) through (d), wherein the first data vector input into each subsequent layer corresponds to the second data vector that is output from the immediately preceding layer in the sequence of multiple sequential layers; and
   a comparison module configured to compare the target output vector and the second data vector that is output from the final layer in the sequence of multiple sequential layers to obtain a loss value that represents a difference between an inference of the multiple sequential layers of the neural network system given the first data vector as the input to the first layer of the multiple sequential layers of the neural network system and the target output vector, and to update the weight matrix values and bias values of each layer in the neural network system based on the loss value.

9. The training system of claim 8, wherein the function is an activation function that generates the second data vector from the first data vector.

10. The training system of claim 8, wherein the adjustment of the weight matrix is based on a processing capability of the training system.

11. The training system of claim 8, wherein the loss value is associated with distortion relative to a classification of the first data vector.

12. The training system of claim 8, wherein each of the first data vector, the target output vector, and the second data vector is one of an image, numerical data, a text file, a sound file, a signal, a one-dimensional matrix, and a video recording.

* * * * *